April 27, 1943. K. F. NYSTROM ET AL 2,317,398
RAILWAY TRUCK STRUCTURE
Original Filed Oct. 31, 1938

INVENTORS
KARL F. NYSTROM
EDMUND S. BECKETTE
VERNON L. GREEN
BY Rodney Bedell
ATTORNEY Patented Apr. 27, 1943

2,317,398

UNITED STATES PATENT OFFICE 2,317,398

RAILWAY TRUCK STRUCTURE

Karl F. Nystrom, Milwaukee, Wis., Edmund S. Beckette, East St. Louis, Ill., and Vernon L. Green, Milwaukee, Wis.; said Beckette assignor to General Steel Castings Corporation, Granite City, Ill., a corporation of Delaware Application February 15, 1940, Serial No. 318,982, now Patent No. 2,272,426, dated February 10, 1942, which is a division of application Serial No. 237,820, October 31, 1938, now Patent No. 2,241,418, dated May 13, 1941. Divided and this application August 15, 1941, Serial No. 406,976

6 Claims. (Cl. 105—226)

The invention relates to railway rolling stock trucks and more particularly to trucks adapted to be used in passenger service.

Reference is made to applicants' copending application, Serial No. 318,982, filed Feb. 15, 1940 (now Patent No. 2,272,426, issued February 10, 1942), of which the present application is a division. That application, in turn, was a division of an earlier application, filed October 31, 1938, now Patent No. 2,241,418, issued May 13, 1941.

The main object of the invention is to improve the riding qualities of light weight cars in high speed service by reducing noise and vibration resulting from metal to metal contact throughout a number of relatively moving truck and body parts, and more particularly to avoid metal to metal contact, and resulting noise and vibration, between the truck bolster and its supporting springs.

This and other detailed objects as will appear from the following description are attained by the structure illustrated in the accompanying drawing, in which—

Figure 1:
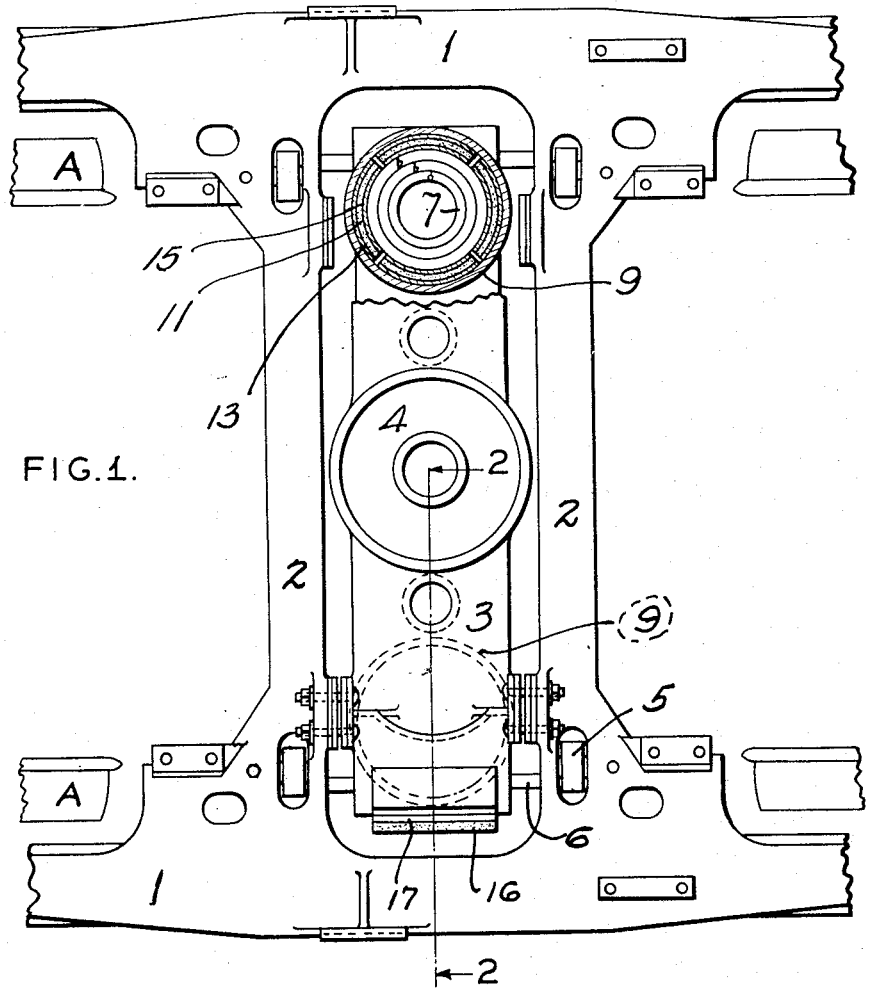
Figure 1 is a top view of a four-wheel truck, the end portions of the truck being broken away, as they are unimportant, to enable the drawing to be made on a larger scale. Also a portion of the bolster is broken away to better illustrate the spring cap structure.
Figure 2:
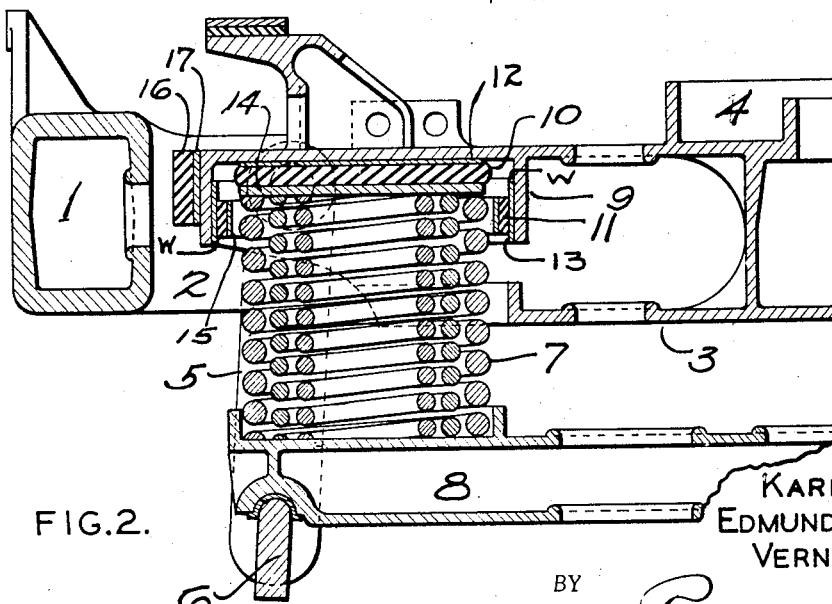
Figure 2 is a vertical transverse section on an enlarged scale taken on the line 2—2 in Figure 1.

The truck includes the usual wheeled axles provided with journal boxes and supporting, either directly or through equalizers, the truck springs. None of the above mentioned parts are shown, except that the wheels are indicated at A, but these parts are of familiar construction and are fully disclosed in the above mentioned copending application and patent.

The truck springs support the truck frame which includes wheel pieces 1 and spaced transverse transoms 2 which receive between them the truck bolster 3 having a center plate 4 receiving the body center plate, not shown, and supporting the truck load.

Swing hangers 5 are pivotally suspended from transoms 2 and at their lower ends support cross bars 6 from which the bolster supporting springs 7 are carried, preferably through a spring plank 8 resting on bars 6 and extending from side to side of the truck.

Each end of bolster 3 includes a downwardly facing spring cap portion, including a depending annular flange 9, for receiving the upper ends of springs 7. The bolster spring cap has applied thereto a rubber pad or disc 10 and a rubber annulus 11. Preferably each of these rubber members is bonded to plates 12 and 13 respectively which may be welded to the bolster casting as indicated at W and, if desired, wear plates 14 and 15 respectively may be bonded to the lower face of pad 10 and the inner face of annulus 11 to protect the rubber from direct contact with the springs. Preferably each annulus 11 comprises a plurality of sections to simplify manufacture and to facilitate application to the spring plank and functioning independently of each other and thereby avoiding stress on one part of the annulus when a portion of the spring strikes another part of the annulus.

Relative lateral movement of the bolster and the springs is limited by the contact of the spring with the opposing elements applied to the spring cap, and the blow resulting from such contact is absorbed and dissipated by the yielding material of the annulus which also absorbs noise which may result from sliding engagement of the metal surfaces.

It is desirable that clearance between the top coils of the spring and the opposing face of the annular ring, or its wear plate, make it possible for the upper end of the spring and the adjacent portion of the bolster to shift laterally relative to each other, and such shifting is accommodated by distortion of pad 10 under thrusts exerted horizontally of the bolster and placing the pad under shear. This distortion may occur without any sliding action of metal members over each other as would result if the spring or its cover plate were in direct contact with the bolster. Accordingly this arrangement provides another means for avoiding undesirable metal contacts between relatively movable parts.

A rubber pad 16 is bonded to a plate 17 applied to the outer end of bolster 3 and opposing the inner face of the frame wheel piece 1 and absorbing shock which might result from excessive lateral movement of the bolster relative to the truck frame.

This construction avoids continuous metal to metal contact between the rail engaging portions of the truck and the body supporting portions of the truck and truck bolster and thereby tends to reduce shocks and absorb vibrations and eliminate noise which otherwise would follow the movement of the wheels over the track.

It will be understood that different types of cushioning structures may be substituted for those shown, and modifications in the details of the truck parts may be made without departing from the spirit of the invention, and the exclusive use of such modifications as come within the scope of the claims is contemplated.

What is claimed is:

1. A railway truck bolster having a downwardly facing recess for receiving the upper end of a bolster supporting spring, there being a flat pad of rubber-like material in the bottom of said recess for overlying the bolster supporting spring and supporting the bolster, the edge of said pad being spaced from the side of said recess, and there being a ring of rubber-like material mounted on the side of said recess below said pad and independently of said pad and positioned adjacent the periphery of said pad for opposing the side of the spring and receiving thrusts therefrom due to relative horizontal movement of the spring and bolster.

2. A structure as described in claim 1 in which the bolster supporting pad comprises a single member throughout its extent and the ring of rubber-like material comprises spaced sections whereby one or more sections may be distorted without affecting the remaining sections.

3. A railway truck bolster spring cap structure including an annular wall arranged to surround a supporting spring device, said wall being provided with a lining of rubber-like material for opposing said spring and for transmitting horizontal thrusts between the bolster and spring, said lining comprising a series of separate segments spaced apart circumferentially of said wall and being individually secured to said wall and distortable independently of each other.

4. In combination, a railway vehicle bolster having a downwardly facing spring cap portion including a depending annular wall, and a spring device having its upper end received in said cap portion and including elements opposing said wall, there being a flat pad of rubber-like material between the top of said device and the opposing face of said cap portion and transmitting the bolster load to said device, there being a cushion of rubber-like material between said wall and said device elements for absorbing lateral shocks between said bolster and device irrespective of distortion of said pad, said pad transmitting the bolster load irrespective of distortion of said cushion.

5. A combination as described in claim 4 in which the cushion between the spring device elements and the cap wall consists of a series of spaced segments which are subject to distortion independently of each other and may be removed independently of each other.

6. In a railway truck bolster, spring cap structure including a depending annular member arranged to surround an opposing supporting spring device member, there being a lateral shock absorbing lining on said bolster member comprising an outer plate secured to said annular member, a rubber-like element bonded to said outer plate, and an inner plate bonded to said element and arranged to oppose the spring device member but normally spaced therefrom, said rubber-like element having end portions facing horizontally and free to bulge laterally in the direction they are facing to accommodate distortion of the element, and relative movement of the plates towards and away from each other, when the lining is subjected to horizontal thrusts by the relative movement of said members horizontally.

KARL F. NYSTROM.
VERNON L. GREEN.
EDMUND S. BECKETTE.